United States Patent
Chang

(10) Patent No.: US 7,554,696 B2
(45) Date of Patent: Jun. 30, 2009

(54) DOT-GAIN REDUCTION METHOD FOR MULTI-LEVEL HALFTONING

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 790 days.

(21) Appl. No.: 10/789,112

(22) Filed: Feb. 26, 2004

(65) Prior Publication Data

US 2005/0190385 A1    Sep. 1, 2005

(51) Int. Cl.
*H04N 1/40* (2006.01)
(52) U.S. Cl. .............. 358/3.01; 358/1.9; 358/3.21; 358/3.23; 382/162; 382/165; 345/612
(58) Field of Classification Search ........... 358/1.8, 358/1.9, 3.13, 534, 3.26, 504, 3.01, 3.02, 358/3.06, 3.21, 3.23; 382/162, 165; 345/612
See application file for complete search history.

(56) References Cited

U.S. PATENT DOCUMENTS

| | | | |
|---|---|---|---|
| 4,706,206 A | 11/1987 | Benoit et al. | |
| 5,383,036 A * | 1/1995 | Mailloux et al. | 358/518 |
| 5,602,572 A | 2/1997 | Rylander | |
| 5,943,477 A * | 8/1999 | Rao et al. | 358/1.8 |
| 6,072,592 A | 6/2000 | Ashworth | |
| 6,376,138 B1 | 4/2002 | Horsten et al. | |
| 6,515,770 B1 | 2/2003 | Rao et al. | |
| 6,525,838 B1 | 2/2003 | Nagae et al. | |

* cited by examiner

*Primary Examiner*—King Y Poon
*Assistant Examiner*—Jamares Washington
(74) *Attorney, Agent, or Firm*—David C. Ripma; Jon M. Dickinson; Robert D. Varitz

(57) ABSTRACT

A method for minimizing color-image halftone dot-gain in the output of a multi-level halftone color-imaging output device. The method includes characterizing that device's halftone output, on a per-color basis, regarding pixel-pattern-specific dot gain which can be related to device pixel-infeed intensity levels, and from that characterizing, creating, and then applying to throughput color-image files, on a pixel-by-pixel basis, and for each output color producible by the device, a pixel-to-device infeed intensity correction value, thus to minimize device-output dot gain.

3 Claims, 2 Drawing Sheets

DOT-GAIN REDUCTION METHOD FOR MULTI-LEVEL HALFTONING

BACKGROUND AND SUMMARY OF THE INVENTION

This invention relates to a method for reducing dot gain with respect to the operation of a multi-level halftoning color-image output device. More specifically, it relates to such a method which is based upon the output-device-specific creation of a pixel infeed intensity correction curve which is employed for adjusting pixel infeed intensity with regard to the feeding of a pixel into a selected multi-level halftone image output device. More particularly, the term "pixel infeed" as used herein specifically refers to the feeding in to such an output device of a colored pixel for ultimate outputting by that device. For the purposes of illustration herein, a preferred manner of practicing the present invention is described in a context where the image output device is a CMYK, multi-level, halftone printer.

It is typical for dot gain to become a problem in, for example, an imaging, or printing, system wherein an output color image is delivered as a halftoned image. Generally speaking, and as is well understood by those skilled in the art, such so-called dot gain typically has two different aspects, one of which is referred to as physical dot gain and the other of which is referred to as optical dot gain.

The present invention proposes a unique methodology for reducing, significantly, both categories of dot gain, in a device-specific manner, and with respect to an output device, such as a printer, which is capable of outputting, in a multi-level manner, a halftoned color image.

According to the invention, for each output color in a halftone mode which an image output device is capable of delivering, a special dot-gain intensity correction curve is generated to control, effectively, the infeed intensity (infeed to the output device) of each pixel in a halftoned, device-infeed pixel data stream. The mentioned pixel infeed intensity correction curve proposed by the present invention is prepared, with respect to a specific color-image output device, by causing that device, in what can be thought of as a calibrating mode, to output, for each of its operative colors, selected halftone dot patterns which are then individually examined for the purpose of determining what kind of a multi-level pixel infeed intensity control needs to be applied to cause an output color image which is halftoned to appear substantially without any appreciable dot gain problems. How this device-specific calibrating activity takes place is described in detail below.

Use of the resulting intensity correction curves has been found to offer a very effective solution to the mentioned halftone output dot-gain issue.

The various important features and advantages of the invention will now become more fully apparent as the description which follows is read in conjunction with the accompanying drawings.

DETAILED DESCRIPTION OF THE INVENTION

Figure 1:
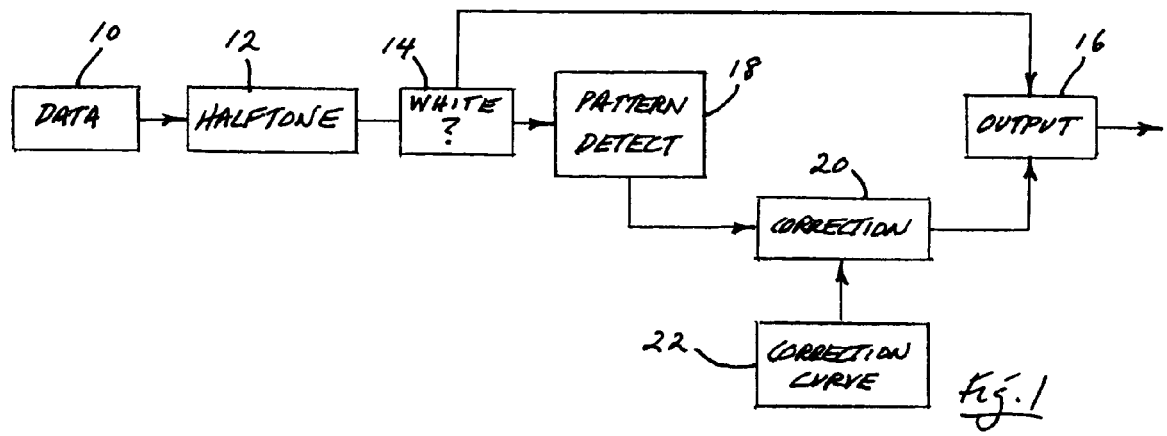
FIG. 1 is a block/schematic diagram generally illustrating a preferred manner of practicing the present invention.

Turning now to the drawings, and referring first of all to FIG. 1, this diagram generally illustrates a preferred manner of practicing of the invention to minimize dot gain in an output, halftoned color image which is furnished as output by a color-imaging, multi-level, halftone image output device. Seven operatively interconnected blocks 10, 12, 14, 16, 18, 20, 22 are shown in FIG. 1.

Block 10 represents initially non-halftoned color-image input pixel data which, downstream from block 10, is appropriately and conventionally halftoned in block 12. From block 12, flowing halftoned pixel data is examined in block 14 to distinguish white pixels from colored pixels, with white pixels from there sent directly for ultimate outputting by output device 16 which herein, for illustration purposes, takes the form of a CMYK printer, and with colored pixels being sent to block 18 for further scrutiny.

Halftoned pixel data directed to block 18 is examined to detect, with regard to each individual pixel which is to be output as a colored pixel, and which, in relation to this examination is referred to herein as a central, contained subject pixel, certain related pixel patterns (shortly to be described) with respect to which halftoned pixel infeed intensity correction is expected to be required. As will become apparent, each pixel so examined in block 18 will indeed be associated as a central, contained subject pixel in one of the "certain" patterns of interest just mentioned above, and once so identified as to pattern association, will then be sent to block 20 for intensity correction in accordance with application of the appropriate intensity correction curve (shortly to be described) drawn from block 22 in FIG. 1. Each such intensity corrected pixel which, of course is an already halftoned pixel, is then fed as an infeed intensity corrected pixel to output printer 16.

Figure 2:
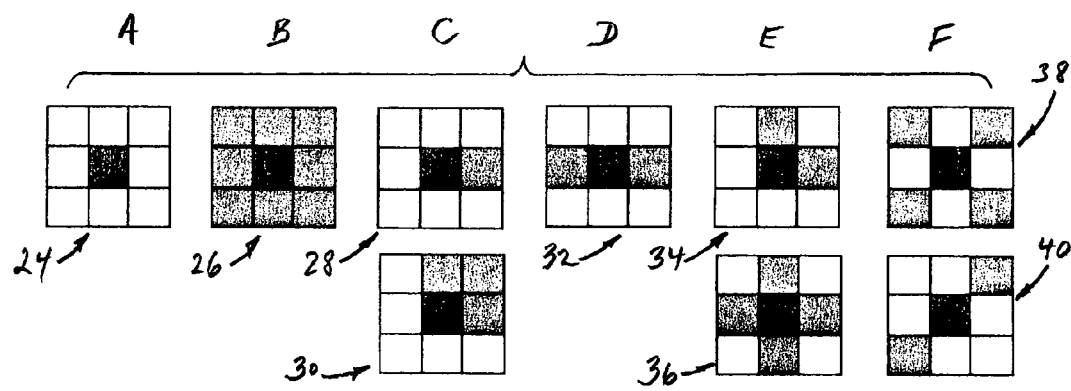
FIG. 2 illustrates a collection of halftoned, device-output pixel patterns, printed by a CMYK printer which is employed herein as a representative output device, which patterns are employed to create a dot-gain infeed pixel intensity correction curve, with these patterns substantially fully representing all relevant output pixel patterns that can potentially introduce different levels of dot gain in a halftoned color output image.

Addressing attention now to FIG. 2, indicated here are nine different nine-member halftoned pixel patterns 24, 26, 28, 30, 32, 34, 36, 38, 40 which are organized into six different groups that are labeled (overhead) A, B, C, D, E and F. These nine-member patterns of pixels are arranged, as can be seen, as 3×3 matrices, with each pattern including a central pixel, darkened for emphasis, which is referred to herein as the above-mentioned, central, contained subject pixel in the pattern. These patterns effectively represent all halftone pixel patterns which will be output by printer 22, in each of its CMYK colors, for every halftone output color image which is output by the printer. As can be seen, Groups A, B and D each comprises only a single pixel pattern, whereas Groups C, E and F each includes two pixel patterns. Generally speaking, the six capital-letter-marked Groups represent pixel patterns that will exhibit different, specific, output dot-gain characteristics which are to be controlled in accordance with practice of the present invention.

A Group-A pixel pattern has a single, central, contained subject pixel which has no neighboring pixels. A Group-B pixel pattern has a central, contained subject pixel with a fully surrounding collection of eight additional neighboring pixels, represented with light grey shading. Group-C type patterns each includes a central, contained subject pixel with either a single, lateral neighbor (pattern 28), or with a pair of lateral neighbors plus an intermediate, single, diagonal neighbor (pattern 30). Pattern Group D includes a single, central, contained subject pixel with two opposite lateral neighbors. The two patterns in pixel Group E each includes a central, contained subject pixel, with that central pixel in pattern 34 further including a pair of diagonally disposed lateral neighbors, and that in pattern 36 including four lateral neighbors. Finally, in each of the two pixel patterns, 38, 40, which make up Group F, a central, contained subject pixel is flanked either by a pair of opposed diagonal neighbors, or by four diagonal neighbors organized in two orthogonally offset diagonal patterns.

It should be understood that in the cases of certain ones of the pixel patterns pictured in FIG. 2, there may be other specific patterns which fit within the Groups, but which might appear somewhat different if presented with different angular orientations in the plane of FIG. 2. For example, pixel pattern 28 represents any such pattern wherein there is a central, contained subject pixel accompanied by any single lateral (but not diagonal) neighbor. Specifically in FIG. 2, such a single, lateral neighbor is shown disposed immediately to the right of the central pixel in group 28, but it should be understood that this neighbor could be in any one of the other three possible, non-diagonal, lateral positions.

In terms of "ranking", generally speaking, with respect to contribution to dot gain, there is an increasing contribution to such gain as one progresses, so-to-speak, from Group A through Group F. As one will see, however, this "ranking" is per se not critical to practice of the invention, inasmuch as correction-curve creation, now to be described, appropriately deals with each one of the patterns regardless of its place in the "rank".

Figure 3:
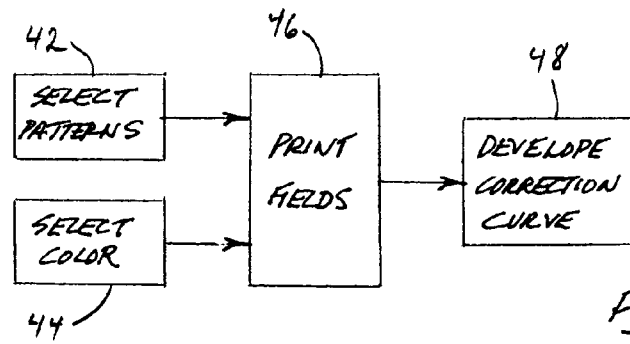
FIG. 3 is a block/schematic diagram generally illustrating the methodologic architecture involved in developing a dot-gain pixel infeed intensity correction curve.

The nine specific pixel patterns which are shown in FIG. 2 are employed, as will now be described, to create a dot-gain, pixel infeed-intensity correction curve in accordance with practice of the present invention. FIG. 3, in a block/schematic diagram, generally illustrates the steps involved in creating such a correction curve. Thus, there are four blocks 42, 44, 46, 48 which are shown in FIG. 3 to illustrate this procedure. According to block 42, and on an individual basis, each one of the pixel patterns pictured in FIG. 2 is selected, one after another, at a "foundation level" of creating, in block 48, a dot-gain correction curve in accordance with practice of the present invention. Block 44 represents the making of a selection, on a color-by-color basis, of each one of the four CMYK output colors that can be output by printer 16. Block 46 represents an instruction to print selected patterns in selected colors for the purpose of generating the correction curve.

In general terms, and for specific calibration use in conjunction with printer 16, one-by-one, each of the nine pixel patterns pictured in FIG. 2 is selected in block 42, with a representative output color from the printer also then selected in block 44. With such a selected pattern and a selected color, the printer is given a command to print in a field, and at a user-choosable pixel infeed "intensity" level, the particular selected pattern in the particular selected color. The infeed intensity level chosen initially for this task is one which will not cause the problem conventionally known as "pollution". Those persons who are generally skilled in the art know how to accomplish this desired "non-pollution" condition. The field so printed is one which contains only pixels that lie centrally within the particular selected pattern.

Figure 4:
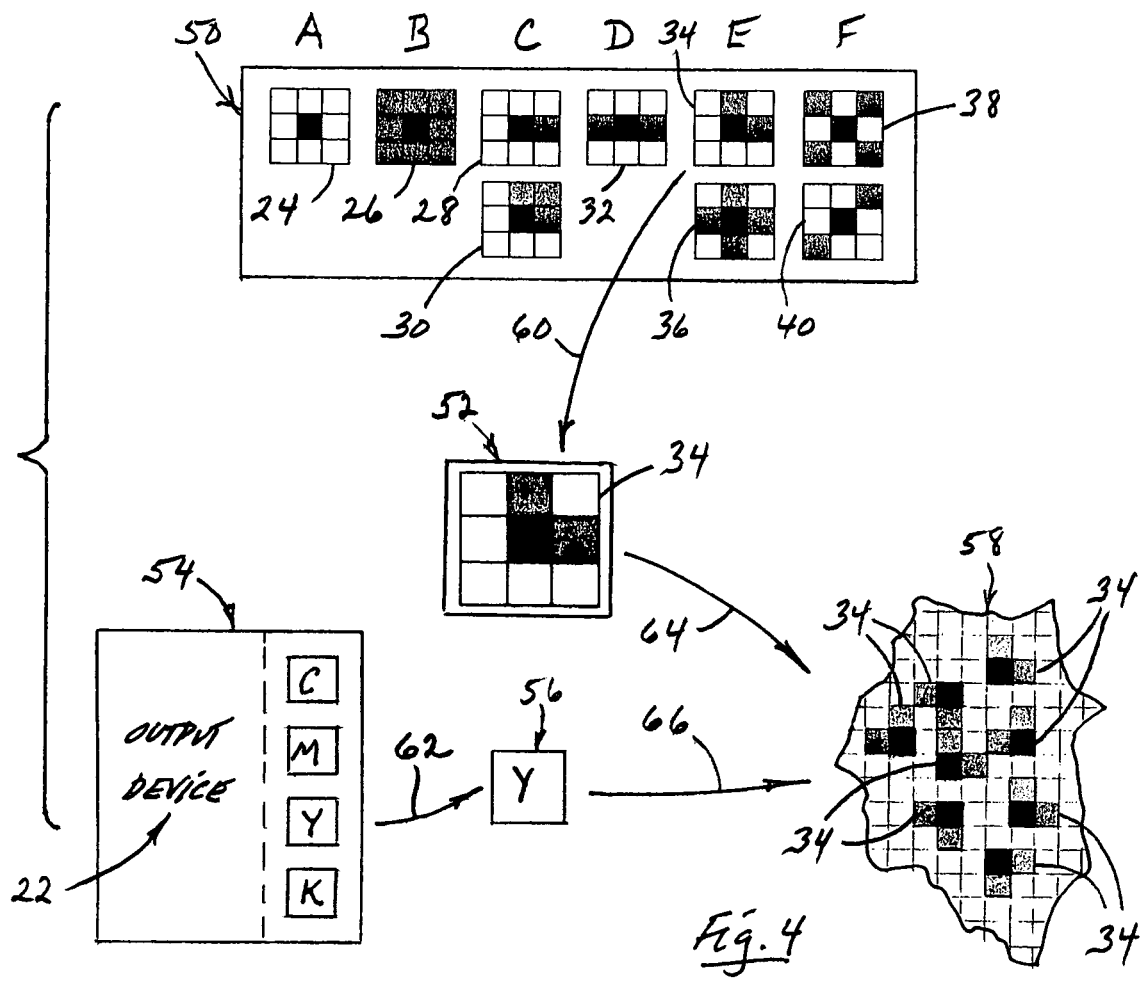
FIG. 4 is a block/schematic diagram illustrating pattern printing on a per-color basis which is employed in accordance with practice of the invention to generate a device-specific, dot-gain correction curve.

Looking at FIG. 4 now along with FIG. 3, here there are shown five different "block-like" graphic elements 50, 52, 54, 56, 58. The very general procedural steps which were just discussed with respect to FIG. 3 are more fully detailed and illustrated in FIG. 4. Accordingly, and considering specifically what is illustrated in FIG. 4, from the entire collection of nine pixel patterns pictured in FIG. 2 (see block 50) a particular pixel pattern, such as pattern 34 in Group E, is selected. This selection is represented at 52 in FIG. 4, and by an arrow 60.

Block 54 represents the process associated with printer 16 of selecting a representative output color from the CMYK colors of the printer. Block 56 and an arrow 62 collectively represent the specific and illustrative selection of color Y.

With these two selections made, the printer is instructed (as suggested by two arrows 64, 66) to print a field, represented fragmentarily by graphic element 58 in FIG. 4, which contains only a distribution of halftone pixel patterns 34. Eight of these specific patterns are shown within element 58, oriented at different angles on the plane of FIG. 4. As was suggested above, the pixel infeed intensity chosen initially for this printing operation is that which is as high as possible without causing the mentioned "pollution" problem.

With such a field of like pixel patterns so printed, a conventional densitometer is employed to "observe" the printed field, and to make a determination about the densitometer-perceived measurable percentage of "area coverage" which is created in the field. This measured percentage of coverage is compared with the "idealized" percentage of coverage which is, of course, directly determinable from the "geometric" nature of the particular pattern which has been selected for printing. With respect to pattern 34, for example, which contains a total of nine pixels, three only of which are to be printed pixels, the idealized percentage of coverage is, essentially, 33-percent. When a densitometer reading is taken to detect any difference in densitometer-perceived coverage, the difference between the perceived coverage and the idealized coverage is utilized, as will now be explained, to create a data point useable in the generation of the desired dot-gain pixel infeed intensity correction curve. In most cases, densitometer-perceived percentage of coverage will exceed idealized percentage of coverage.

After initial densitometer measurement and percentage-of-coverage comparison, the infeed pixel intensity to multi-level printer 16 is appropriately adjusted, and reprinting of the same pixel pattern in a field takes place, and this process is repeated enough times until one finally arrives at a condition where the densitometer reading matches the idealized percentage of coverage. The amount of pixel infeed intensity adjustment, or change, thus required to cause printer 16 to print pixel pattern 34 in the Y color so that a densitometer reading of area coverage is essentially 33-percent, defines an infeed intensity correction amount which will then be associated in a correction curve for the color Y with respect to every output-device infeed pixel which is the central, contained subject pixel in a type-34 pixel pattern.

Figure 5:
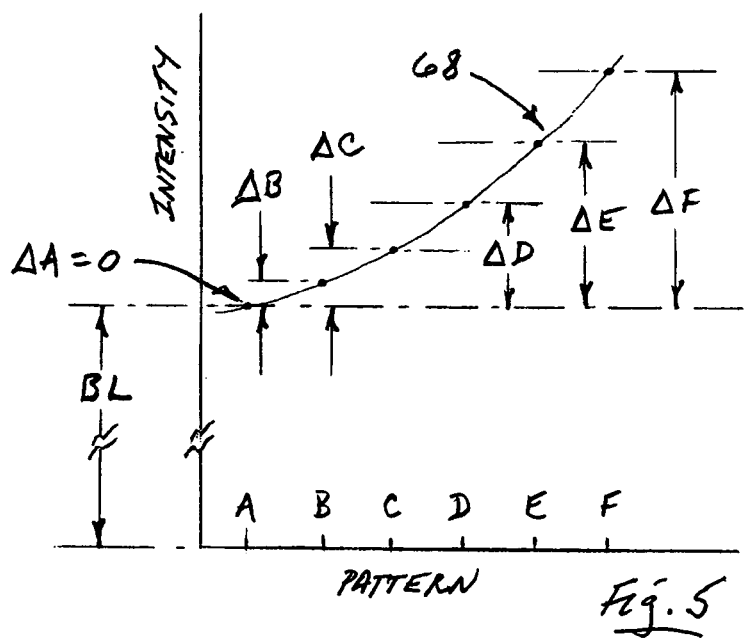
FIG. 5 provides a representative illustration of a typical dot-gain correction curve prepared for utilization in accordance with practice of the present invention.

This "calibration" process is repeated for each and every one of the nine pixel patterns described herein, and (with respect to each such pattern) for each one of the four CMYK colors associated with printer 16. A plot of resulting data points, such as that which is shown at 68 in FIG. 5, is created to be employed thereafter for pixel infeed-intensity correction, thus to reduce and minimize the problem of dot gain thereafter in the operation of printer 16. In the specific illustration now being given, where there are four output colors and nine pixel patterns, there will be thirty-six correction curves.

Looking specifically at FIG. 5, here, on X and Y axes, there is a plot, or curve, 68 of required infeed pixel intensity correction versus pixel Group for a particular single one of the output printer's available output colors. The several black dots (six of them) which lie along curve 68 in FIG. 5 represent, for such a single, given printer output color, such as the Y output color, a curve of pixel infeed-intensity correction which is required to deal with dot gain. The six (Group-related) data points which define curve 68 in FIG. 5 represent Δ-corrections which are combined with a baseline correction which is shown in FIG. 5 by a double-headed measurement arrow BL.

The BL correction that is applied for all pixel Groups is determined essentially by the correction required for that Group (referred to as the determining Group) which needs the least amount of correction. For the Groups other than this "determining" Group, the correction used is the sum of BL+Δ (A, B, C, D, E or F). Normally, the correction employed in pixel infeed intensity to the associated, calibrated output device, is a negative (intensity-reducing) correction.

With all appropriate intensity-reduction curves thus created for a given halftone, multi-level, color-image output device, such as for printer 16, a system employing that output device is appropriately instructed (a) to observe the specific pattern within which each color pixel which is to be output by the device lies as a central, contained subject pixel, and (b), with this determination made—in block 18 in FIG. 1—the appropriate correction is called in from the appropriate correction curve (block 22 in FIG. 1), and (c) an infeed intensity correction is applied (block 20 in FIG. 1) to control the infeed intensity for that pixel in the output device in order to effect the desired dot-gain reduction.

The process/method thus proposed by the invention is very efficient and effective. It is especially effective both because of the fact that correction is applied to already halftoned infeed pixels which are to be supplied to an output device, and because of the fact that correction is based upon output-device-specific data which is associated with observed, halftoned output that is linked to known, expected halftoned output pixel patterns that exhibit known dot-gain characteristics. The invention is practiceable with any desired selection of halftone pixel patterns that contain the discussed central, contained subject pixels, and that are expected to emerge eventually as halftoned output pixels from an output device of the type generally described herein. The pixel matrix selected for a pattern is, or course, not limited to a 3×3 matrix.

Thus, while a preferred and best mode manner of practicing the invention has been described, and certain variations and modifications mentioned, it is appreciated that other variations and modifications may be made without departing form the spirit of the invention.

I claim:

1. A device-specific, physical and optical dot-gain reducing method for multi-level color-image halftoning regarding the output of a selected color-imaging multi-level halftone output device with respect to which individual pixels within a dot may have different intensities, said method comprising based upon observed pixel-infeed-to-(multi-level)halftoning-pixel-output operational characteristics of such a device, creating a pixel-and-color-specific dot-gain reduction curve which relates, as data points for each output color of the device, selected corrections in device per-pixel pixel infeed intensity to different pre-selected, specific, multi-level, halftone geometric dot patterns of plural pixels including a contained subject pixel which is to be output from the device, where those dot patterns include a predetermined geometric pixel arrangement possessing (a) a central pixel, which is the mentioned subject pixel, and (b) the presence or absence of a defined collection and geometric distribution of immediately neighboring pixels, and further where those patterns collectively represent the halftone dot-pattern population characteristics of an expected multi-level, per-pixel-intensity-corrected, halftoned color image which is to be output by the device, at a point in the image-processing flow of a stream of color-image pixel data which is upstream from the region where color-image device outputting takes place, and downstream from where multi-level halftoning of that data occurs, and for each pixel in the data which is to be output ultimately to become a color-visible pixel, determining in which pre-selected multi-level, halftone dot pattern that pixel effectively lies and is associated as the contained subject pixel, and the output color intended for that pixel, relevant to said determining, and in relation to such a determined halftone dot pattern, appropriately applying to the associated, contained subject pixel, as the sole physical and optical dot-gain-reduction instrumentality, the created dot-gain reduction curve, and by said reduction-curve applying, reducing both physical and optical dot-gain contributions of the subject pixel in whatever multi-level halftoned image is associated with that subject pixel.

2. The method of claim 1, wherein each pre-selected multi-level, halftone dot pattern takes the form of a three-by-three matrix of pixels.

3. The method of claim 1, wherein the selected output device is a multi-level printer, and said creating is based upon densitometer inspections of such different pre-selected multi-level, halftone dot patterns which have been printed by the printer as a group of plural, next-adjacent, same patterns, and wherein further, with respect to each such densitometer-inspected pattern, data points used to create the mentioned curve are determined by comparing (a) densitometer-perceived percentage-of-coverage readings that are taken of the printed output pattern with (b) the idealized geometrical-percentage-of-coverage of non-white pixels in the pattern.

* * * * *